US012686575B1

(12) United States Patent
Dwivedi et al.

(10) Patent No.: US 12,686,575 B1
(45) Date of Patent: Jul. 21, 2026

(54) AUTOMATED UNLOADING SYSTEM FOR PACKAGE STACKS

(71) Applicant: Amazon Technologies, Inc., Seattle, WA (US)

(72) Inventors: Rajeev Dwivedi, Sammamish, WA (US); Ameya Abhyankar, Franklin, TN (US); Thomas Lee Dahlberg, Mobile, AL (US)

(73) Assignee: Amazon Technologies, Inc., Seattle, WA (US)

( * ) Notice: Subject to any disclaimer, the term of this patent is extended or adjusted under 35 U.S.C. 154(b) by 614 days.

(21) Appl. No.: 18/305,699

(22) Filed: Apr. 24, 2023

(51) Int. Cl.
*B65G 67/32* (2006.01)
*B65G 59/02* (2006.01)

(52) U.S. Cl.
CPC ............. *B65G 67/32* (2013.01); *B65G 59/02* (2013.01); *B65G 2814/0355* (2013.01)

(58) Field of Classification Search
CPC ................................. B65G 65/23; B65G 67/32
See application file for complete search history.

(56) References Cited

U.S. PATENT DOCUMENTS

| | | | | | |
|---|---|---|---|---|---|
| 3,978,999 | A | * | 9/1976 | Ryder | B65G 65/23 |
| | | | | | 414/404 |
| 4,802,810 | A | * | 2/1989 | Gunn | B65G 59/08 |
| | | | | | D34/28 |
| 6,012,891 | A | * | 1/2000 | Timmins | B65G 65/23 |
| | | | | | 414/421 |
| 10,023,405 | B2 | * | 7/2018 | Kim | B65G 47/40 |
| 10,954,084 | B2 | * | 3/2021 | Stenson | B65G 69/003 |
| 12,151,907 | B1 | * | 11/2024 | Dwivedi | B65G 65/02 |
| 2019/0322475 | A1 | * | 10/2019 | Hartmann | B65G 65/23 |

* cited by examiner

*Primary Examiner* — Jonathan Snelting

(74) *Attorney, Agent, or Firm* — Athorus, PLLC

(57) ABSTRACT

Automated unloading systems and methods may include a preparation subsystem and a transfer subsystem. A package stack may be loaded into the preparation subsystem to open or enable access to individual packages of the stack, and the opened stack may be rotated to an unloading position. Then, conveyance mechanisms of the transfer subsystem may cause automated unloading of individual packages of the opened stack, thereby improving the safety, speed, and efficiency of such package unloading processes.

20 Claims, 7 Drawing Sheets

SLIDING MECHANISM
230

Docket No.: P81372-US01 / 110.1281-US

6/7

AUTOMATED UNLOADING SYSTEM FOR PACKAGE STACKS

BACKGROUND

Many companies may receive, sort, store, package, and ship items and/or groups of items at material handling facilities. For example, many companies may receive, sort, and store items in a material handling facility, and pack, sort, and ship items to various destinations (e.g., customers, stores) from the material handling facility. Various material handling systems and processes may receive items or packages in stacks, such as pallets, carts, or gaylords. However, conventional item or package unloading systems and methods may be substantially manual, slow, and expensive, and also include corresponding ergonomic and occupational safety issues. Accordingly, there is a need for automated unloading systems and methods to safely, reliably, and efficiently unload items or packages for various downstream processes in a material handling facility.

DETAILED DESCRIPTION

Figure 1A:
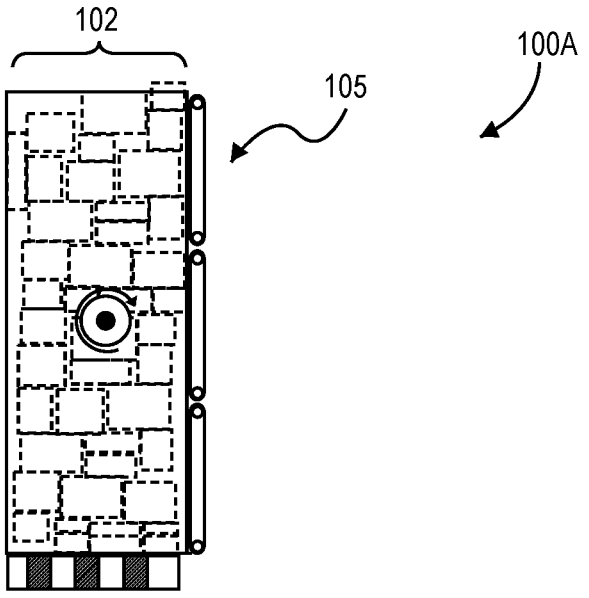
FIG. 1A is a schematic side view diagram of an example automated unloading system in a first position, in accordance with implementations of the present disclosure.

As is set forth in greater detail below, implementations of the present disclosure are directed to example automated unloading systems for safe, reliable, and efficient processing of package stacks, in which the package stacks may be opened or accessed in order to automatically unload individual items or packages for various downstream processes.

In example embodiments, an example automated unloading system may include a preparation subsystem and a transfer subsystem. The automated unloading system may comprise a base and a frame received or positioned within the base. The base may form a structure for both of the preparation subsystem and the transfer subsystem, and the base may be configured to tilt between two or more positions, e.g., a nominal position, an opening position, and/or an unloading position. The frame may be configured to receive a stack of packages, and the frame may be movable or slidable within the base between the preparation subsystem and the transfer subsystem.

The preparation subsystem may receive a stack of packages, and the stack may be opened or otherwise modified to provide access to individual items or packages, e.g., via various manual and/or automated processes. In some example embodiments, the automated unloading system may tilt the base and frame to an opening position before, during, and/or after opening of the stack of packages, in order to prevent falling out or dropping of items or packages.

The transfer subsystem may receive the opened stack of packages from the preparation subsystem for automated unloading of individual items or packages. For example, the transfer subsystem may comprise various belts, conveyors, sorters, rollers, wheels, or other similar conveyance mechanisms to cause unloading of the individual items or packages from the opened stack of packages. In some example embodiments, the automated unloading system may tilt the base and frame to an unloading position, in order to facilitate safe, reliable, and efficient automated unloading of individual items or packages.

In example embodiments, the stack of packages may comprise a pallet with a plurality of stacked items or packages, and may also include plastic or stretch wrap surrounding the stack of packages. In additional example embodiments, the stack of packages may comprise a movable or rolling cart with a plurality of stacked items or packages and one or more doors or panels to provide access. In some example embodiments, the stack of packages may comprise a gaylord, e.g., a large cardboard box having an open top face, or other types of carriers with a plurality of stacked items or packages. In further example embodiments, various robotic drive units, mobile drive units, autonomous guided vehicles, pallet jacks, lifts, forklifts, or other types of material handling equipment may be associated or coupled with the stack of packages.

Moreover, the example stacks of packages may comprise various combinations of pallets, carts, gaylords, wraps, doors, panels, robotic drive units, mobile drive units, autonomous guided vehicles, pallet jacks, lifts, forklifts, or other types of material handling equipment. Furthermore, the individual items or packages may comprise books, electronics, housewares, clothing, grocery items, or various other types of items, which may be aggregated or packed in various types of packaging such as bottles, jugs, jars, cans, bags, boxes, totes, crates, or other containers.

Using the example automated unloading systems and methods described herein, various stacks of packages may be substantially automatically opened and unloaded in a safe, reliable, and efficient manner, thereby improving the speed and efficiency of such processes and facilitating various downstream processes within a material handling facility.

Figure 1B:
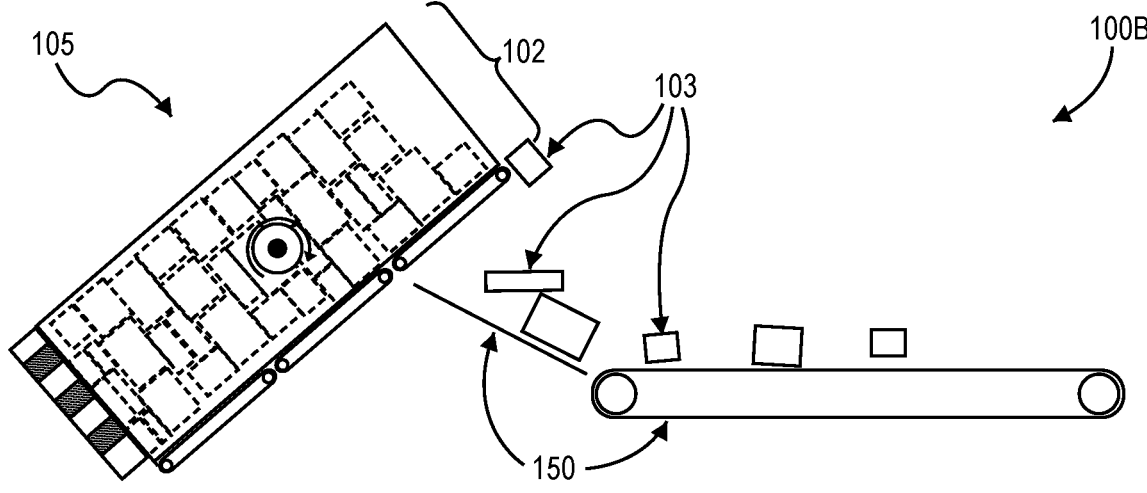
FIG. 1B is a schematic side view diagram of an example automated unloading system in a second position, in accordance with implementations of the present disclosure.

FIG. 1A is a schematic side view diagram 100A of an example automated unloading system in a first position, in accordance with implementations of the present disclosure. FIG. 1B is a schematic side view diagram 100B of an example automated unloading system in a second position, in accordance with implementations of the present disclosure.

As shown in FIG. 1A, a stack 102 of packages may be loaded into or received by an automated unloading system 105 in a first position, e.g., in a nominal, upright, and/or opening position. Subsequent to loading the stack 102 of packages to a preparation subsystem of the automated unloading system 105, the stack 102 of packages may be opened or otherwise modified to provide or enable access to individual items or packages. Then, the opened stack 102 of packages may be moved, slid, or transitioned to a transfer subsystem of the automated unloading system 105, as described in further detail herein.

As shown in FIGS. 1A and 1B, the transfer subsystem may comprise one or more belts, conveyors, sorters, rollers, wheels, or other conveyance mechanisms to facilitate automated unloading of individual items or packages. As shown in FIG. 1B, in order to facilitate automated unloading of the individual items or packages 103 from the opened stack 102, the automated unloading system 105 may be rotated or tilted to a second position, e.g., an unloading position. With the automated unloading system 105 in the unloading position, the one or more belts, conveyors, sorters, rollers, wheels, or other conveyance mechanisms may be actuated to substantially automatically unload individual items or packages 103 from the opened stack 102 to various downstream systems or processes, e.g., a downstream conveyance system 150 that may include various slides, chutes, belts, conveyors, or other systems. As described in further detail herein, the one or more belts, conveyors, sorters, rollers, wheels, or other conveyance mechanisms may be actuated with various speeds, directions, sequences, orders, or other attributes to automatically unload individual items or packages 103 in a desired manner.

Using the systems and methods described herein, stacks of packages may be substantially automatically opened or otherwise modified to enable access to individual items or packages. In addition, the individual items or packages may be substantially automatically unloaded or transferred to various downstream processes. Further, the tilting and automated unloading of individual packages may prevent damage or other losses from dropped or falling packages associated with conventional unloading processes. Moreover, the automated unloading of individual packages may improve the speed, reliability, and efficiency of these processes, while also reducing or eliminating ergonomic or occupational safety hazards or risks associated with conventional manual unloading processes.

Although FIGS. 1A and 1B illustrate a particular number, type, configuration, or arrangement of various portions or components of an example automated unloading system, other example embodiments may include various other numbers, types, configurations, or arrangements of various portions or components, as further described herein. Further, although FIGS. 1A and 1B illustrate particular first and second positions of the automated unloading system, other example embodiments may include various other first and second positions, and/or additional positions, associated with various processing steps of the automated unloading system.

Figure 2B:
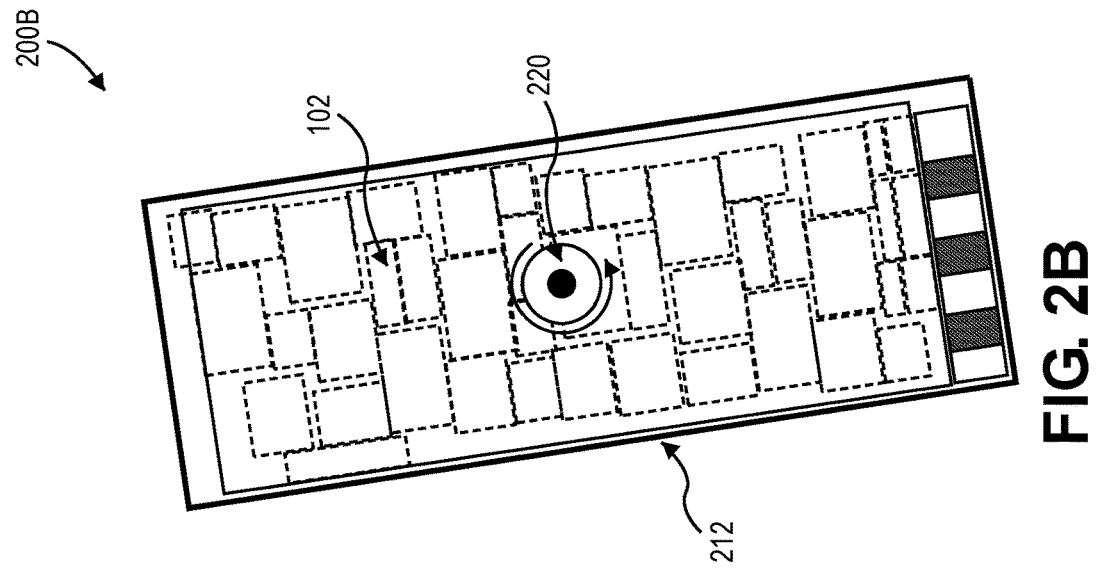
FIG. 2B is a schematic side view diagram of an example automated unloading system in an opening position, in accordance with implementations of the present disclosure.
Figure 2A:
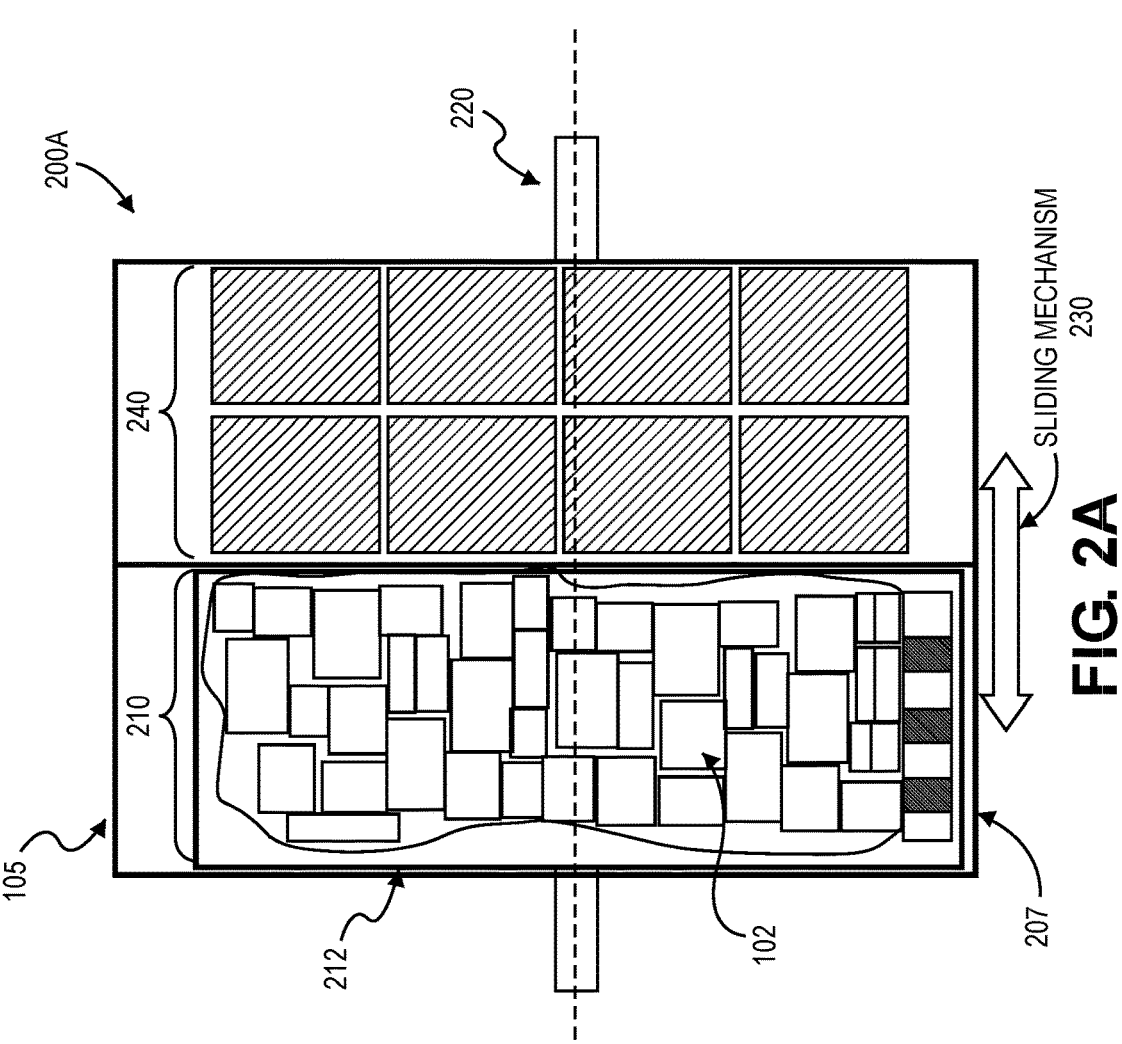
FIG. 2A is a schematic front view diagram of an example automated unloading system having a preparation subsystem and a transfer subsystem in a nominal position, with an example stack of packages received within the preparation subsystem, in accordance with implementations of the present disclosure.

FIG. 2A is a schematic front view diagram 200A of an example automated unloading system having a preparation subsystem and a transfer subsystem in a nominal position, with an example stack of packages received within the preparation subsystem, in accordance with implementations of the present disclosure.

As shown in FIG. 2A, the example automated unloading system 105 may comprise a base 207 and a frame 212 positioned within the base 207. In addition, the example automated unloading system 105 may comprise a preparation subsystem 210 and a transfer subsystem 240.

In example embodiments, the base 207 may comprise a substantially rectangular prism or structure having a floor surface, three closed lateral side surfaces, one open lateral side surface, and an open top surface. In the schematic front view of FIG. 2A, the floor surface may be a substantially flat, horizontal, bottom surface that extends left and right on the page of FIG. 2A. The open lateral side surface may be an opening that extends parallel to a plane of the page of FIG. 2A and closest to the viewer of the page of FIG. 2A. Two of the closed lateral side surfaces may be substantially flat, vertical, side surfaces that extend up and down on opposite sides of the page of FIG. 2A, and a third closed lateral side surface may be a substantially flat, vertical, rear surface that extends parallel to a plane of the page and farthest from the viewer of the page of FIG. 2A. In addition, the open top surface may be an opening that extends horizontally across top edges of the three closed lateral side surfaces toward a top of the page of FIG. 2A. In this manner, the base 207 may comprise a partially closed, substantially rectangular prism or structure having a floor and three closed lateral sides, and an open top and one open lateral side.

The frame 212 may also comprise a substantially rectangular prism or structure having a floor surface, three closed lateral side surfaces, one open lateral side surface, and an open top surface. Similar to but smaller in size and dimensions relative to the base 207, the frame 212 may include a floor surface that is a substantially flat, horizontal, bottom surface, two closed lateral side surfaces that are substantially flat, vertical, side surfaces, and a third closed lateral side surface that is a substantially flat, vertical, rear surface. In addition, similar to but smaller in size and dimensions relative to the base 207, the frame 212 may include an open top surface and an open lateral side surface. In this manner, the frame 212 may also comprise a partially closed, substantially rectangular prism or structure having a floor and three closed lateral sides, and an open top and one open lateral side. Moreover, the open top surfaces and open lateral side surfaces of the base 207 and frame 212 may be aligned with and positioned adjacent each other.

The base 207 and frame 212 may be formed from one or more plates, beams, rods, trusses, or other structural elements in order to receive and retain stacks 102 of packages, and individual items or packages therein, within the automated unloading system 105. In addition, the base 207 and frame 212 may be formed from various materials, such as metals, plastics, composites, wood, other materials, or combinations thereof.

In example embodiments, the preparation subsystem 210 may comprise a first portion of the example automated unloading system 105, e.g., a left side of the system 105 as shown in FIG. 2A. For example, the preparation system 210 may be configured to receive or load a stack 102 of packages into the automated unloading system 105. The stack 102 may be received within the frame 212 that is positioned within the base 207. At the preparation subsystem 210, one or more operations or processes may be performed to open or otherwise modify the stack 102 to provide or enable access to individual items or packages of the stack 102.

Various elements, such as an actuator, hinge, slide, cutter, or other types of elements, may be associated with the preparation subsystem 210 and utilized or actuated to enable access to items or packages of the stack 102. Further details of the preparation subsystem 210 are described herein at least with respect to FIGS. 3A-3C.

In example embodiments, the transfer subsystem 240 may comprise a second portion of the example automated unloading system 105, e.g., a right side of the system 105 as shown in FIG. 2A. For example, the transfer subsystem 240 may comprise one or more conveyance mechanisms that are positioned along or within at least a portion of the open lateral side surface of the base 207. The one or more conveyance mechanisms may comprise various types of belts, conveyors, sorters, rollers, wheels, or other types of conveyance mechanisms. In addition, the conveyance mechanisms may be actuated, e.g., via various motors or actuators, to cause substantially automated unloading of individual items or packages from the stack 102. Further details of the transfer subsystem 240 are described herein at least with respect to FIGS. 4 and 5.

In additional example embodiments, a rotating or tilt mechanism 220 may be coupled or associated with the base 207. In addition, the rotating or tilt mechanism 220 may be coupled or secured to the ground or another base structure via various beams, plates, mounts, supports, stands, or others structural components (not shown), in order to enable tilting of the base 207 and frame 212 relative to the ground or base structure. For example, the tilt mechanism 220 may be coupled to two opposing, closed lateral sides of the base 207. The tilt mechanism 220 may enable rotation, pivoting, or tilting of the base 207, as well as the frame 212 and a stack 102 of packages positioned therein, relative to the ground or base structure. In addition, the tilt mechanism 220 may comprise various types of mechanisms and/or actuators, such as rotary actuators, linear actuators, pneumatic actuators, pulleys, servos, rack and pinion mechanisms, or other types of mechanisms and/or actuators. Further details of operation of the tilt mechanism 220 are described herein at least with respect to FIGS. 2B and 5.

In further example embodiments, a sliding or slide mechanism 230 may be operatively coupled between the base 207 and the frame 212. The slide mechanism 230 may enable movement or sliding of the frame 212 relative to the base 207 between the preparation subsystem 210 and the transfer subsystem 240. For example, slide mechanism 230 may comprise various types of mechanisms and/or actuators, such as linear actuators, rotary actuators, pneumatic actuators, pulleys, servos, screw drive mechanisms, rack and pinion mechanisms, belts, conveyors, rollers, wheels, robotic drive units, automated guided vehicles, or other types of mechanisms and/or actuators. Further details of operation of the slide mechanism 230 are described herein at least with respect to FIG. 4.

As shown in FIG. 2A, a stack 102 of packages may be loaded into or received by the frame 212 that is positioned within the base 207 of the automated unloading system 105. For example, the stack 102 may be received by the frame 212 while the frame 212 is positioned in the preparation subsystem 210 portion of the automated unloading system 105.

In some example embodiments, the stack 102 of packages may be loaded into the frame 212 and base 207 using a pallet jack, lift, forklift, or other at least partially manually operated material handling equipment. In other example embodiments, the stack 102 of packages may be loaded into the frame 212 and base 207 substantially automatically, e.g., using a robotic drive unit, automated guided vehicle, or other robotic or automated vehicle that pulls, lifts, carries, and/or transports the stack 102.

Further, in some example embodiments, equipment, robots, or vehicles such as pallet jacks, lifts, robotic drive units, automated guided vehicles, or others may load the stack 102 of packages into the frame 212 and then exit or leave the frame 212 before the automated unloading system 105 continues with further steps of the automated unloading processes. In other example embodiments, equipment, robots, or vehicles such as pallet jacks, lifts, robotic drive units, automated guided vehicles, or others may be loaded into the frame 212 together with the stack 102 of packages and remain with the stack 102 during further steps of the automated unloading processes, in which case the various equipment or vehicles may be at least partially secured, retained, or held in position by various clamps, locks, latches, braces, or other securing components associated with the frame 212 and/or base 207.

In further example embodiments, one or more sensors may be associated with the frame 212 and/or base 207. For example, the sensors may comprise light curtains, photo-eyes, proximity sensors, imaging devices or sensors, ranging sensors, weight sensors, or other types of sensors. The sensors may detect whether a stack 102 and/or carrier thereof has been loaded into the frame 212 and/or base 207, and/or whether a stack 102 and/or carrier thereof has been unloaded or removed from the frame 212 and/or base 207. Further steps of the automated unloading processes may be initiated, modified, paused, and/or stopped based on detection of loading or unloading of a stack and/or carrier thereof by various sensors.

FIG. 2B is a schematic side view diagram 200B of an example automated unloading system in an opening position, in accordance with implementations of the present disclosure.

As shown in FIG. 2B, subsequent to loading the stack 102 of packages into the frame 212 and base 207, the base 207 may be rotated or tilted by the tilt mechanism 220 to an opening position. In addition, rotation or tilting of the base 207 may be performed before, during, or after enabling access to individual items or packages of the stack 102.

The opening position may be tilted in a first direction relative to an upright, nominal position by operation of the tilt mechanism 220. As shown in FIG. 2B, the open lateral sides of the frame 212 and base 207 may be positioned toward a right side of the page of FIG. 2B, and the open top surfaces of the frame 212 and base 207 may be positioned toward an upper portion of the page of FIG. 2B. In the opening position that is tilted in the first direction shown in FIG. 2B, the individual items or packages may be rotated in order to generally maintain or retain the packages within the frame 212 and base 207, e.g., by force of gravity. Further, the opening position may be rotated or tilted in the first direction by various angles relative to horizontal, e.g., more or less than the example angle schematically illustrated in FIG. 2B.

In addition, subsequent to loading the stack 102 of packages into the frame 212 and base 207, the stack 102 may be opened or otherwise modified to enable access to individual items or packages therein. For example, plastic or stretch wrap material that has been wrapped around the stack 102 may be cut, opened, and/or removed. In addition, one or more doors or panels of a cart or carrier holding the stack 102 may be opened, moved, and/or removed. Further, one or more portions, sections, faces, or sides of a gaylord or carrier may be cut, opened, and/or removed. Further details of the preparation subsystem 210 are described herein at least with respect to FIGS. 3A-3C.

In some example embodiments, one or more sensors may be associated with the tilt mechanism 220 in order to detect, measure, and/or instruct desired angles of rotation or tilt of the frame 212 and/or base 207. For example, the sensors may comprise motor or actuator encoders, photoeyes, proximity sensors, imaging devices or sensors, or other types of sensors. By detecting and/or measuring tilt angles of the frame 212 and/or base 207, desired tilt angles for the opening position may be determined and/or instructed in order to prevent falling or dropping of one or more items or packages from the stack 102. Further steps of the automated unloading processes may be initiated, modified, paused, and/or stopped based on detection of tilt angles of the frame 212 and/or base 207 by various sensors.

In further example embodiments, one or more sensors may be associated with the open lateral sides and/or open top surfaces of the frame 212 and/or base 207. For example, the sensors may comprise light curtains, photoeyes, proximity sensors, imaging devices or sensors, ranging sensors, or other types of sensors. The sensors may detect whether one or more items or packages may be protruding or extending away from the stack 102 and toward the open lateral sides and/or open top surfaces. In addition, the sensors may detect whether one or more items or packages may have fallen or dropped from the stack 102 via the open lateral sides and/or open top surfaces. Further steps of the automated unloading processes may be initiated, modified, paused, and/or stopped based on detection of movement or shifting of one or more items or packages by various sensors.

Figures 3A, 3B, 3C:
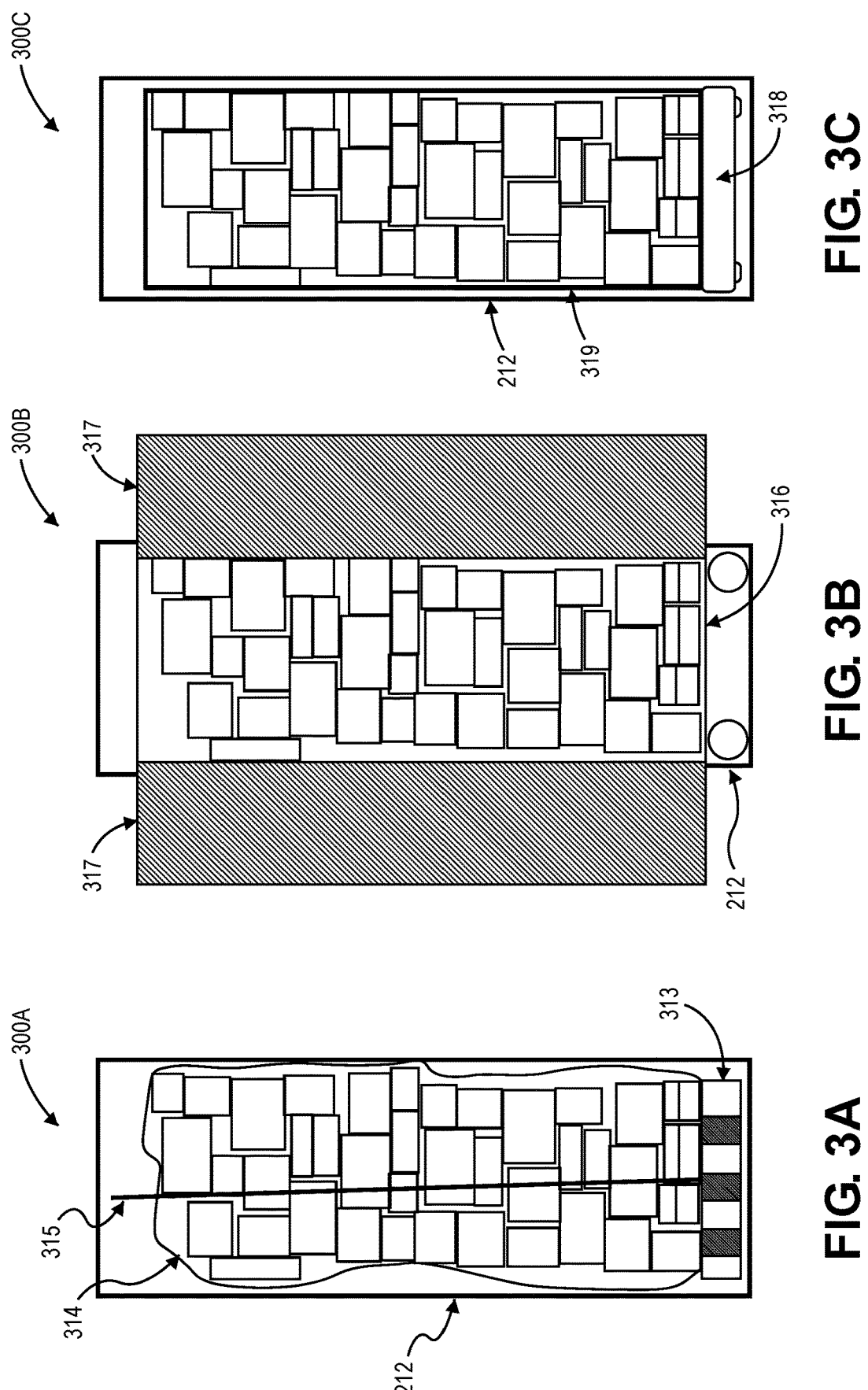
FIG. 3A is a schematic front view diagram of an example preparation subsystem of an automated unloading system that has received a first example stack of packages, in accordance with implementations of the present disclosure.
FIG. 3B is a schematic front view diagram of an example preparation subsystem of an automated unloading system that has received a second example stack of packages, in accordance with implementations of the present disclosure.
FIG. 3C is a schematic front view diagram of an example preparation subsystem of an automated unloading system that has received a third example stack of packages, in accordance with implementations of the present disclosure.

FIG. 3A is a schematic front view diagram 300A of an example preparation subsystem of an automated unloading system that has received a first example stack of packages, in accordance with implementations of the present disclosure.

As described herein at least with respect to FIGS. 3A-3C, various types, configurations, and/or combinations of package stacks and carriers may be loaded or received by the frame 212 and/or base 207 of the automated unloading systems.

As shown in FIG. 3A, a pallet 313 may carry a stack of packages, and a plastic or stretch wrap 314 may be wrapped or applied around the stack of packages to retain or hold individual packages on the pallet 313. The pallet 313 carrying the stack of packages may be moved or loaded into the frame 212 and/or base 207 by various manual and/or automated processes, such as by using pallet jacks, lifts, or forklifts. In some examples described herein, the pallet 313 may be lifted, pushed, pulled, carried, and/or loaded into the frame 212 and/or base 207 using robotic drive units, automated guided vehicles, or other robotic or automated vehicles or equipment.

In order to open or enable access to individual items or packages of the stack of packages carried by the pallet 313, the plastic or stretch wrap 314 that is aligned or adjacent with an open lateral side of the frame 212 and/or base 207 may be cut, opened, and/or removed by various manual and/or automated processes. For example, one or more knives, cutters, or other tools may be used or operated to cut the plastic wrap 314, e.g., by human associates, robotic arms, or other movement or manipulation systems. Then, the plastic wrap 314 may be removed or unwrapped from around the stack of packages. In some example embodiments, an abrasive string or cutting implement 315 may be applied to or integrally formed with the plastic wrap 314, and the abrasive string 315 may be pulled to tear, rip, or cut a side, edge, or surface of the plastic wrap 314, e.g., by human associates, robotic arms, or other movement or manipulation systems. Then, the plastic wrap 314 may be removed or unwrapped from around the stack of packages.

In additional example embodiments, the plastic wrap 314 may not be fully removed or unwrapped from around the stack of packages. Instead, the cut portions of the plastic wrap 314 may be held or secured in an open position, e.g., using various clips, clamps, hooks, magnets, or other securing elements, such that an open portion of the plastic wrap 314 may substantially correspond to the open lateral face of the frame 212 and/or base 207 to enable access to individual packages.

FIG. 3B is a schematic front view diagram 300B of an example preparation subsystem of an automated unloading system that has received a second example stack of packages, in accordance with implementations of the present disclosure.

As shown in FIG. 3B, a cart 316 may carry a stack of packages, and the cart 316 may include one or more openable, movable, and/or removable doors or panels 317 to retain or hold individual packages in the cart 316, as well as one or more wheels or rollers to facilitate movement of the cart 316. The cart 316 carrying the stack of packages may be moved or loaded into the frame 212 and/or base 207 by various manual and/or automated processes, such as by using pallet jacks, lifts, or forklifts. In some examples described herein, the cart 316 may be lifted, pushed, pulled, carried, and/or loaded into the frame 212 and/or base 207 using robotic drive units, automated guided vehicles, or other robotic or automated vehicles or equipment.

In order to open or enable access to individual items or packages of the stack of packages carried by the cart 316, the one or more doors or panels 317 that are aligned or adjacent with an open lateral side of the frame 212 and/or base 207 may be opened, slid, moved, and/or removed by various manual and/or automated processes, e.g., by human associates, robotic arms, or other movement or manipulation systems. For example, hinged doors or panels may be rotated and opened, sliding doors or panels may be slid, moved, or opened, and/or removable doors or panels may be disconnected and/or removed.

In additional example embodiments, the one or more doors or panels 317 of the cart 316 may be held or secured in an open position, e.g., using various locks, latches, clips, clamps, hooks, magnets, or other securing elements, such that an open portion of the cart 316 may substantially correspond to the open lateral face of the frame 212 and/or base 207 to enable access to individual packages.

FIG. 3C is a schematic front view diagram 300C of an example preparation subsystem of an automated unloading system that has received a third example stack of packages, in accordance with implementations of the present disclosure.

As shown in FIG. 3C, a robotic drive unit or automated guided vehicle 318 may carry, lift, or transport a gaylord or other carrier 319 that has received a stack of packages, and the gaylord 319 may include one or more openable, movable, and/or removable sides, panels, or surfaces. For example, the gaylord 319 may comprise a substantially rectangular prism or box structure having a floor surface, four closed lateral sides, and an open top surface that may generally be used for loading packages into the gaylord 319. In some alternative example embodiments, the gaylord 319 carrying the stack of packages may be moved or loaded into the frame 212 and/or base 207 by various manual and/or automated processes, such as by using pallet jacks, lifts, or forklifts. In the examples described herein, the gaylord 319 may be lifted, pushed, pulled, carried, and/or loaded into the frame 212 and/or base 207 using robotic drive units, automated guided vehicles, or other robotic or automated vehicles or equipment 318.

In order to open or enable access to individual items or packages of the stack of packages carried by the gaylord 319, the one or more sides, edges, panels, or surfaces of the gaylord 319 that are aligned or adjacent with an open lateral side of the frame 212 and/or base 207 may be cut, opened, and/or removed by various manual and/or automated processes. For example, one or more knives, cutters, or other tools may be used or operated to cut a portion of the gaylord 319, e.g., by human associates, robotic arms, or other movement or manipulation systems. Then, the cut portions of the gaylord 319 may be opened or removed from around the stack of packages.

In additional example embodiments, the cut portions of the gaylord 319 may not be fully removed from around the stack of packages. Instead, the cut portions of the gaylord 319 may be held or secured in an open position, e.g., using various clips, clamps, hooks, magnets, or other securing elements, such that an open portion of the gaylord 319 may substantially correspond to the open lateral face of the frame 212 and/or base 207 to enable access to individual packages.

In addition to the examples described herein with respect to FIGS. 3A-3C, various other types of carriers having a stack of packages may be loaded into the frame 212 and/or base 207 for automated unloading of individual items or packages. In addition, various combinations of pallets, wraps, carts, gaylords, other types of carriers, pallet jacks, lifts, forklifts, robotic drive units, automated guided vehicles, and/or other robotic or automated vehicles may be used to load stacks of packages and enable access to individual packages therein to facilitate automated unloading processes as further described herein.

In further example embodiments, one or more sensors may be associated with the open lateral sides and/or open top surfaces of the frame 212 and/or base 207, as well as cut, opened, and/or removed portions or sections of stacks of packages. For example, the sensors may comprise light curtains, photoeyes, proximity sensors, imaging devices or sensors, ranging sensors, or other types of sensors. The sensors may detect whether plastic wrap has been cut, opened, and/or removed from a side or surface of a stack of packages, whether one or more doors or panels are open, moved, and/or removed, and/or whether a side or surface of a gaylord or other carrier has been cut, opened, and/or removed. Further steps of the automated unloading processes may be initiated, modified, paused, and/or stopped based on detection of sufficient or appropriate access to one or more items or packages of a stack by various sensors.

Figure 4:
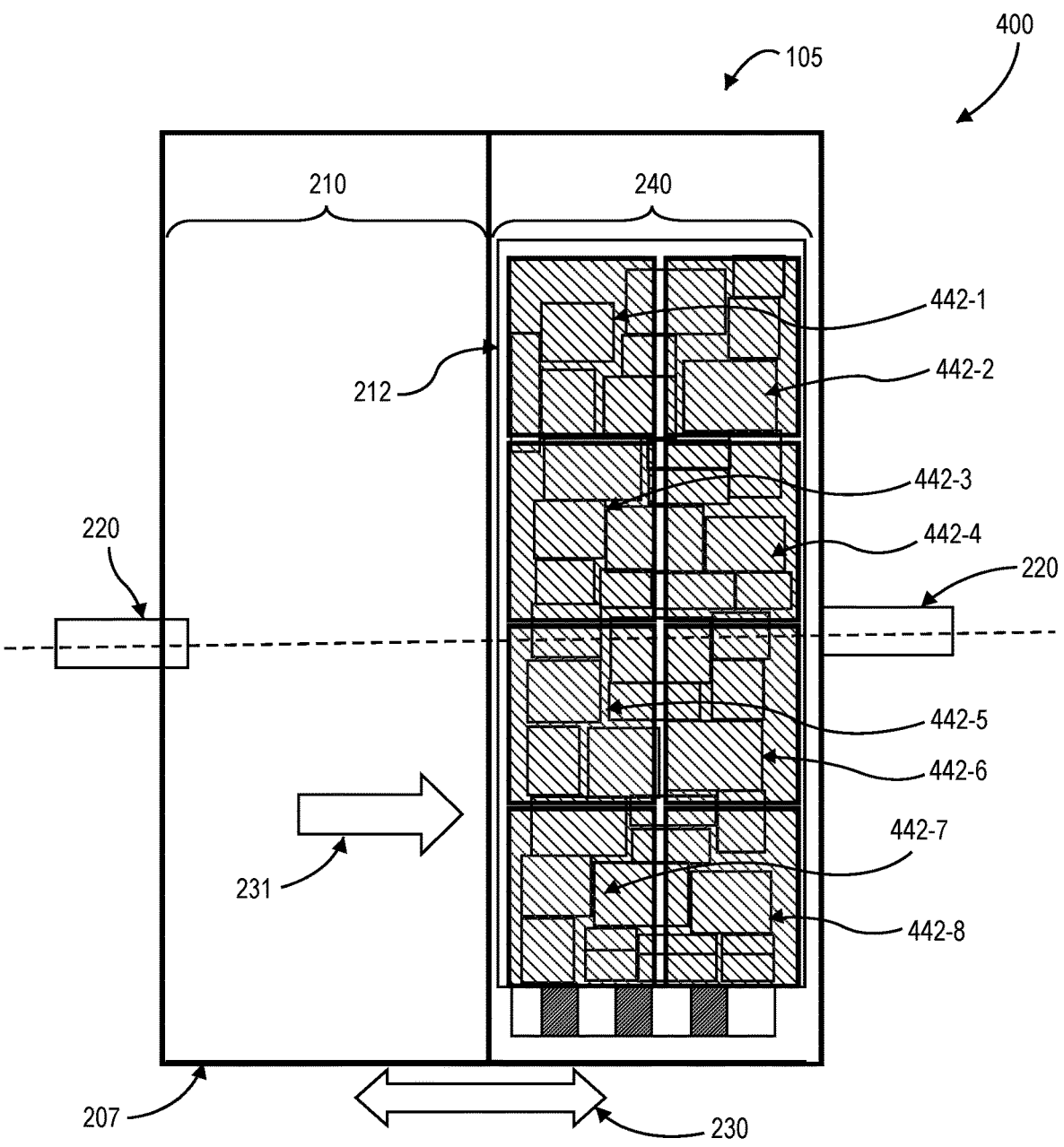
FIG. 4 is a schematic front view diagram of an example automated unloading system having a preparation subsystem and a transfer subsystem in a nominal or opening position, with an example stack of packages received within the transfer subsystem, in accordance with implementations of the present disclosure.

FIG. 4 is a schematic front view diagram 400 of an example automated unloading system having a preparation subsystem and a transfer subsystem in a nominal or opening position, with an example stack of packages received within the transfer subsystem, in accordance with implementations of the present disclosure.

As shown in FIG. 4, subsequent to loading a stack of packages into the frame 212 and/or base 207 of the automated unloading system 105, and further subsequent to opening or enabling access to individual packages of the stack, the stack of packages may be moved, slid, or transitioned 231 from the preparation subsystem 210 to the transfer subsystem 240 via the slide mechanism 230.

In some example embodiments, the slide mechanism 230 may be operatively coupled between the base 207 and the frame 212 to enable movement or sliding of the frame 212 relative to the base 207 between the preparation subsystem 210 and the transfer subsystem 240. For example, the slide mechanism 230 may comprise various types of mechanisms and/or actuators, such as linear actuators, rotary actuators, pneumatic actuators, pulleys, servos, screw drive mechanisms, rack and pinion mechanisms, belts, conveyors, rollers, wheels, or other types of mechanisms and/or actuators. In this manner, the frame 212 that may have received a stack of packages may be moved, slid, or transitioned 231 between the preparation subsystem 210 and the transfer subsystem 240.

In alternative example embodiments, the frame 212 may not be fixed or coupled to the base 207, and instead, a cart, gaylord, or other carrier may comprise the frame 212 that may be positioned within the base 207. In some examples, the slide mechanism 230 may similarly comprise various types of mechanisms and/or actuators to enable movement or sliding of the frame 212 relative to the base 207. In other examples, a robotic drive unit, automated guided vehicle, or other robotic or automated vehicle that is positioned within the base 207 with the frame 212 may comprise the slide mechanism 230. Then, the robotic drive unit, automated guided vehicle, or other robotic or automated vehicle may be instructed or commanded to move, slide, or transition 231 the frame 212 relative to the base 207 between the preparation subsystem 210 and the transfer subsystem 240.

Responsive to moving, sliding, or transitioning 231 the frame 212 and stack of packages to the transfer subsystem 240, an open side, face, or portion of the stack of packages, as well as the open lateral side of the frame 212, may be aligned or adjacent with one or more conveyance mechanisms 442 of the transfer subsystem 240. As described herein, the conveyance mechanisms 442 of the transfer subsystem 240 may be positioned within or along an open lateral side of the base 207, such that the conveyance mechanisms 442 are substantially aligned or adjacent with the open lateral side of the frame 212 and the open portion of the stack of packages upon transitioning the frame 212 and stack to the transfer subsystem 240. As a result, at the transfer subsystem 240, the stack of packages may be substantially enclosed or surrounded on all lateral sides by sides, faces, or portions of the frame 212, base 207, and/or conveyance mechanisms 442.

The conveyance mechanisms 442 may comprise various types, numbers, configurations, or arrangements of belts, conveyors, sorters, rollers, wheels, or other similar conveyance mechanisms. For example, as shown in FIG. 4, the conveyance mechanisms 442 may comprise eight belts or conveyors 442-1, 442-2, 442-3, 442-4, 442-5, 442-6, 442-7, 442-8 arranged in a two-by-four grid pattern that substantially covers or encloses the open side or portion of the stack of packages. Other example embodiments may include various other types, numbers, configurations, arrangements, or combinations of conveyance mechanisms 442.

In some example embodiments, the conveyance mechanisms 442 may comprise bi-directional or multi-directional belts or conveyors, independently or individually controllable rollers or wheels, sorting shoes or cross sorting belts or conveyors, and/or various other types of multi-directional and/or independently controllable conveyance mechanisms. By using such multi-directional and/or independently controllable conveyance mechanisms, various sorting functions may also be incorporated or integrated into the automated unloading processes described herein.

In some example embodiments, one or more sensors may be associated with the slide mechanism 230 in order to detect, measure, and/or instruct desired movements or positions of the frame 212 and/or stack of packages relative to the base 207. For example, the sensors may comprise motor or actuator encoders, photoeyes, proximity sensors, imaging devices or sensors, ranging sensors, or other types of sensors. By detecting and/or measuring movements or positions of the frame 212 and/or stack relative to the base 207, desired movements and/or positions of the frame 212 and/or stack may be determined and/or instructed in order to facilitate automated unloading of one or more items or packages from the stack. Further steps of the automated unloading processes may be initiated, modified, paused, and/or stopped based on detection of movements or positions of the frame 212 by various sensors.

Further, as previously described herein, one or more sensors may be associated with the open lateral sides and/or open top surfaces of the frame 212 and/or base 207. For example, the sensors may comprise light curtains, photoeyes, proximity sensors, imaging devices or sensors, ranging sensors, or other types of sensors. The sensors may detect whether one or more items or packages may be protruding or extending away from the stack and toward the open lateral sides and/or open top surfaces. In addition, the sensors may detect whether one or more items or packages may have fallen or dropped from the stack via the open lateral sides and/or open top surfaces. Further steps of the automated unloading processes may be initiated, modified, paused, and/or stopped based on detection of movement or shifting of one or more items or packages during movements of the slide mechanism 230 by various sensors.

Figure 5:
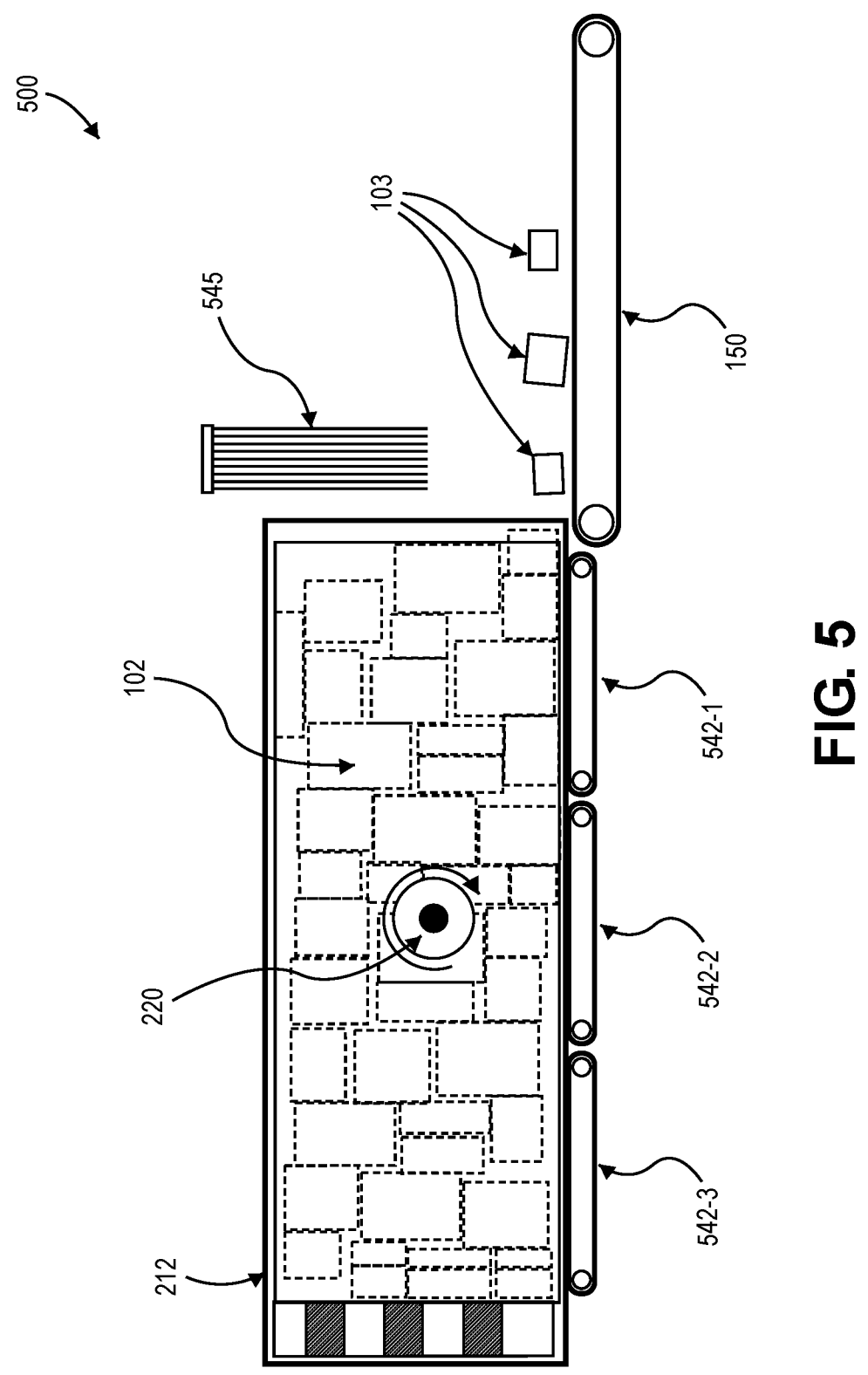
FIG. 5 is a schematic side view diagram of an example automated unloading system in an unloading position, in accordance with implementations of the present disclosure.

FIG. 5 is a schematic side view diagram 500 of an example automated unloading system in an unloading position, in accordance with implementations of the present disclosure.

As shown in FIG. 5, subsequent to transitioning the frame 212 and stack 102 to the transfer subsystem 240, the base 207 may be rotated or tilted by the tilt mechanism 220 to an unloading position. In addition, rotation or tilting of the base 207 may be performed from various positions, e.g., from the upright, nominal position, the opening position, or various other positions.

The unloading position may be tilted in a second direction relative to an upright, nominal position by operation of the tilt mechanism 220. The second direction may be substantially opposite to the first direction of rotation from the upright, nominal position to the opening position described in FIG. 2B. As shown in FIG. 5, in the unloading position, the open lateral sides of the frame 212 and base 207 may be positioned toward a bottom side of the page of FIG. 5, and the open top surfaces of the frame 212 and base 207 may be positioned toward a right side of the page of FIG. 5. In the unloading position that is tilted in the second direction shown in FIG. 5, the individual items or packages may be rotated or shifted such that a force of gravity may cause the individual packages to rest upon or contact one or more conveyance mechanisms 542 of the transfer subsystem 240. Further, the unloading position may be rotated or tilted in the second direction by various angles relative to horizontal, e.g., more or less than the example approximately ninety degree tilt angle schematically illustrated in FIG. 5.

In some example embodiments, one or more sensors may be associated with the tilt mechanism 220 in order to detect, measure, and/or instruct desired angles of rotation or tilt of the frame 212 and/or base 207. For example, the sensors may comprise motor or actuator encoders, photoeyes, proximity sensors, imaging devices or sensors, or other types of sensors. By detecting and/or measuring tilt angles of the frame 212 and/or base 207, desired tilt angles for the unloading position may be determined and/or instructed in order to facilitate automated unloading of one or more items or packages from the stack 102. Further steps of the automated unloading processes may be initiated, modified, paused, and/or stopped based on detection of tilt angles of the frame 212 and/or base 207 by various sensors.

Subsequent to rotating or tilting the frame 212 and/or base 207 to the unloading position as desired, the one or more conveyance mechanisms 542 of the transfer subsystem 240 may be actuated to substantially automatically unload individual items or packages 103 from the stack 102. Although FIG. 5 illustrates three example conveyance mechanisms 542-1, 542-2, 542-3, the conveyance mechanisms 542 may comprise various types, numbers, configurations, arrangements, or combinations of conveyance mechanisms, including belts, conveyors, sorters, rollers, wheels, or other similar conveyance mechanisms.

In example embodiments, the conveyance mechanisms 542 may be individually or collectively actuated with desired movement attributes, such as speed, direction, or others. Further, the conveyance mechanisms 542 may be actuated in various sequences or orders, which may facilitate separation and/or singulation of individual items or packages 103 during the automated unloading processes. For example, a first set of conveyance mechanisms 542 closer to an open top surface of the frame 212 and/or stack 102 may be actuated first, a second set of conveyance mechanisms 542 adjacent the first set of conveyance mechanisms 542 may be actuated second, a third set of conveyance mechanisms 542 closer to a floor surface of the frame 212 and/or stack 102 may be actuated third, and so forth. In addition, some of the conveyance mechanisms 542 may be actuated to bias or direct the individual items or packages to a particular side or edge, e.g., a right side or left side relative to a direction of movement, of a downstream conveyance system 150, which may further facilitate separation and/or singulation of individual items or packages 103 during the automated unloading processes.

In additional example embodiments, the rotation or tilting of the frame 212, base 207, and/or stack 102 of packages may also be instructed in combination, and/or in desired sequences or orders, with actuation of various conveyance mechanisms 542. Thus, at a first unloading position or tilt angle, a first set of conveyance mechanisms 542 may be actuated, at a second unloading position or tilt angle, a second set of conveyance mechanisms 542 may be actuated, at a third unloading position or tilt angle, a third set of conveyance mechanisms 542 may be actuated, and so forth.

In other example embodiments, one or more curtains, crossbars, or other components 545 may be positioned proximate an open top surface of the frame 212, base 207, and/or stack 102 at one or more unloading positions of the frame 212. The curtains or crossbars 545 may comprise flexible, movable, or resilient components, such as fibers, strands, plastics, sheets, blinds, or other similar components. Alternatively, the curtains or crossbars 545 may comprise substantially rigid, fixed, or immovable components, such as beams, rods, plates, walls, barricades, or other similar components.

The curtains or crossbars 545 may prevent items or packages 103 that are stacked upon each other in one or more unloading positions from tumbling, toppling, or falling out of the stack 102 and onto the downstream conveyance system 150 in an uncontrolled or unsafe manner. In addition, the curtains or crossbars 545 may cause reorientation or rotation of individual items or packages 103 onto respective sides of the items having generally larger surface areas, thereby increasing the stability of the unloaded items or packages. Further, the curtains or crossbars 545 may be coupled to portions of the base 207 and/or frame 212, and/or may be positioned at fixed or defined locations relative to the downstream conveyance system 150.

In further example embodiments, one or more sensors may be associated with the open lateral sides and/or open top surfaces of the frame 212 and/or base 207, and/or with the downstream conveyance system 150. For example, the sensors may comprise light curtains, photoeyes, proximity sensors, imaging devices or sensors, ranging sensors, or other types of sensors. The sensors may detect whether one or more items or packages remain within the frame 212 and stack, and/or whether one or more items are being unloaded from the frame 212 and stack. Further steps of the automated unloading processes may be initiated, modified, paused, and/or stopped based on detection of some or no remaining items during automated unloading of one or more items or packages by various sensors.

Although the example embodiments described herein generally refer to an automated unloading system having a preparation subsystem and a transfer subsystem that are separate and adjacent to each other, other example embodiments may have various other configurations or arrangements of the preparation and transfer subsystems.

For example, in alternative example embodiments, the actuators, cutters, hinges, slides, or other elements of the preparation subsystem and the conveyance mechanisms of the transfer subsystem may be configured to move relative to a base and/or frame that may be substantially stationary. Thus, instead of a slide mechanism to transition the frame and stack between the preparation and transfer subsystems, the elements or actuators of each of the preparation and transfer subsystems may move, e.g., using a slide mechanism or other types of similar movement mechanisms. The tilt mechanism may operate substantially as described herein to rotate or tilt the frame, base, and/or stack. As a result, in a first configuration, the elements or actuators of the preparation subsystem may be moved or positioned adjacent the frame and/or base to open or enable access to a loaded stack of packages while the elements or actuators of the transfer subsystem may not be positioned adjacent the frame and/or base. Likewise, in a second configuration, the elements or actuators of the transfer subsystem may be moved or positioned adjacent the frame and/or base to unload items or packages from the stack while the elements or actuators of the preparation subsystem may not be positioned adjacent the frame and/or base.

In further alternative example embodiments, the actuators, cutters, hinges, slides, or other elements of the preparation subsystem and the conveyance mechanisms of the transfer subsystem may be substantially stationary at respective positions relative to a base and/or frame that may also be substantially stationary. Thus, no slide mechanisms or other similar movement mechanisms may be included, and the operations of each of the preparation and transfer subsystems may be performed at a single stationary position of the base and/or frame. The tilt mechanism may operate substantially as described herein to rotate or tilt the frame, base, and/or stack. In addition, one closed lateral side of the base and/or frame may be openable, e.g., via hinges or slides, to allow loading and unloading of stacks of packages to the frame and/or base of the automated unloading system. As a result, in a first process step, the elements or actuators of the preparation subsystem may be actuated to open or enable access to a loaded stack of packages while the elements or actuators of the transfer subsystem may not be actuated. Likewise, in a second process step, the elements or actuators of the transfer subsystem may be actuated to unload items or packages from the stack while the elements or actuators of the preparation subsystem may not be actuated.

In additional example embodiments, the preparation subsystem may include a rotation mechanism in addition to or as an alternative to the slide mechanism. For example, the rotation mechanism may enable at least partial rotation of the frame relative to the base around a vertical axis that extends substantially through a geometric center of the frame in the nominal, upright position of the unloading system. In this manner, when a package stack is loaded into the frame, the package stack may be rotated between two or more positions around the vertical axis. The rotation mechanism may comprise various types of mechanisms and/or actuators, such as rotary actuators, linear actuators, pneumatic actuators, pulleys, servos, rack and pinion mechanisms, robotic drive units, automated guided vehicles, or other types of mechanisms and/or actuators.

Furthermore, rotation of the package stack around a vertical axis within the preparation subsystem may enable or facilitate cutting and/or removal of plastic wrap from around multiple sides or faces of the stack of packages, opening or sliding of one or more panels or doors along one or more lateral sides of a cart, and/or cutting, opening, and/or removal of portions of a gaylord or other carrier from one or more lateral sides. In addition, rotation of the package stack may enable access to multiple lateral faces or sides of the loaded package stack as needed or desired. Further, rotation of the package stack may allow loading of package stacks and associated carriers from a first lateral side or face of the system, which may be different from a second lateral side or face of the system along which the conveyors, belts, rollers, or wheels of the transfer subsystem are arranged. Moreover, in example embodiments in which the preparation subsystem and the transfer subsystem are associated with a single, substantially stationary position of a base and/or frame without any slide mechanism, rotation of the package stack may enable loading and/or preparation of the package stack to be completed with respect to a first lateral side or face of the unloading system, and also enable unloading of individual packages by conveyors, belts, rollers, or wheels that are associated with a second lateral side or face of the unloading system.

Figure 6:
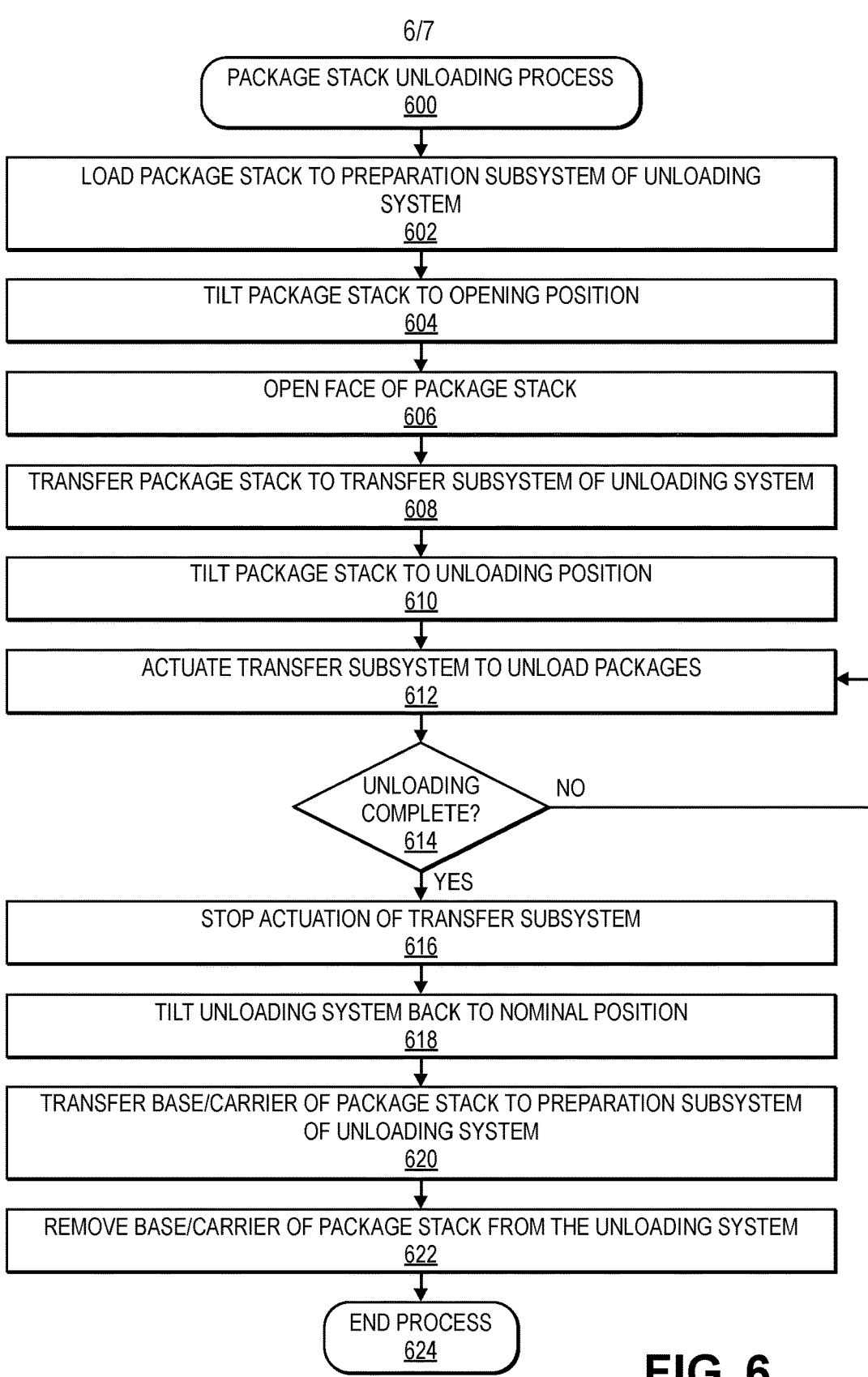
FIG. 6 is a flow diagram illustrating an example package stack unloading process, in accordance with implementations of the present disclosure.

FIG. 6 is a flow diagram illustrating an example package stack unloading process 600, in accordance with implementations of the present disclosure.

The process 600 may begin by loading a package stack to a preparation subsystem of an unloading system, as at 602. For example, a pallet, cart, gaylord, or other carrier may carry a stack of packages. The package stack may be loaded to the preparation subsystem by various manual and/or automated processes, such as pallet jacks, lifts, forklifts, robotic drive units, automated guided vehicles, other robotic or automated vehicles, or others. In addition, the package stack may be loaded into a frame and/or a base of the unloading system. Further, a control system may command or instruct loading of the package stack to the preparation subsystem.

The process 600 may continue by tilting the package stack to an opening position, as at 604. For example, a rotation or tilt mechanism may be associated with the base and/or frame, and the tilt mechanism may rotate or tilt the base and/or frame to a first position, e.g., an opening position. The opening position may be rotated in a first direction relative to an upright, nominal position of the base and/or frame. In addition, the opening position may generally maintain or retain individual packages of the package stack within the base and/or frame, e.g., by force of gravity. Further, a control system may command or instruct tilting of the package stack to the opening position.

The process 600 may proceed by opening a face of the package stack, as at 606. For example, one face of the package stack may be aligned or adjacent with respective open lateral sides of the base and/or frame. The face of the package stack may be opened or otherwise modified to enable access to individual packages of the stack. Enabling access may include cutting and/or removing plastic wrap that encloses the stack, opening and/or removing one or more doors or panels, and/or cutting and/or removing portions of a gaylord or other carrier that retains the packages. Further, a control system may command or instruct opening the face of the package stack.

The process 600 may continue to transition the package stack to a transfer subsystem of the unloading system, as at 608. For example, a movement or slide mechanism may be operatively coupled between the base and the frame to enable movement or sliding of the frame relative to the base between the preparation subsystem and the transfer subsystem. The slide mechanism may be actuated to move the opened package stack to the transfer subsystem in order to initiate automated unloading of individual packages. In addition, various conveyance mechanisms of the transfer subsystem may be aligned with or positioned along the open face of the package stack. Further, a control system may command or instruct transitioning of the package stack to the transfer subsystem.

The process 600 may proceed to tilt the package stack to an unloading position, as at 610. For example, the rotation or tilt mechanism that is associated with the base and/or frame may rotate or tilt the base and/or frame to a second position, e.g., an unloading position. The unloading position may be rotated in a second direction relative to an upright, nominal position of the base and/or frame, in which the second direction may be substantially opposite to the first direction. In addition, the unloading position may generally cause individual packages of the package stack to rest upon or contact the conveyance mechanisms of the transfer subsystem, e.g., by force of gravity. Further, a control system may command or instruct tilting of the package stack to the unloading position.

The process 600 may continue with actuating the transfer subsystem to unload packages, as at 612. For example, various types, numbers, configurations, and combinations of conveyance mechanisms may be associated with the transfer subsystem. In addition, the conveyance mechanisms may be actuated with various attributes, such as speed, direction, sequences, orders, or other movement attributes. By selective actuation of the conveyance mechanisms with desired movement attributes, the individual packages may be substantially automatically unloaded, sorted, separated, and/or singulated from the package stack to various downstream systems or processes. Further, a control system may command or instruct actuating the transfer subsystem to unload packages.

The process 600 may proceed with determining whether the unloading is complete, as at 614. For example, one or more sensors may detect whether any packages remain within the frame, base, and/or stack to be unloaded. Alternatively, the unloading process may be determined or programmed to operate for a set period of time or duration before automatically stopping. Various other methods or processes, either manual or automated, may be used to determine whether unloading is complete. If it is determined that the unloading is not complete, the process 600 may return to step 612 to continue actuating the transfer subsystem to unload packages.

If, however, it is determined that the unloading is complete, the process 600 may continue by stopping actuation of the transfer subsystem, as at 616. For example, the various conveyance mechanisms associated with the transfer subsystem may be stopped upon completion of unloading from the package stack. The individual packages of the package stack may have been transferred, sorted, separated, and/or singulated to various downstream systems or processes. Further, a control system may command or instruct stopping actuation of the transfer subsystem.

The process 600 may then proceed by tilting the unloading system back to the nominal position, as at 618. For example, the rotation or tilt mechanism that is associated with the base and/or frame may rotate or tilt the base and/or frame to a nominal position, e.g., an upright, substantially vertical position. The nominal position may be an initial upright, nominal position of the base and/or frame. In addition, various package stacks and/or carriers associated therewith may be loaded and/or unloaded with respect to the frame and/or base of the unloading system at the nominal position. Further, a control system may command or instruct tilting of the package stack and/or carrier to the nominal position.

The process 600 may then continue to transfer a base or carrier of the package stack to the preparation subsystem of the unloading system, as at 620. For example, the movement or slide mechanism that may be operatively coupled between the base and the frame may be actuated to move the carrier of the package stack from the transfer subsystem to the preparation subsystem after automated unloading of individual packages. In addition, the carrier may comprise a pallet, cart, gaylord, or other carrier that may receive a package stack, as well as various pallet jacks, lifts, robotic drive units, automated guided vehicles, other robotic or automated vehicles, and/or other material handling equipment. Further, a control system may command or instruct transfer of the carrier to the preparation subsystem.

The process 600 may proceed to remove the base or carrier of the package stack from the unloading system, as at 622. For example, a pallet, cart, gaylord, or other carrier from which a package stack may have been automatically unloaded may be unloaded or removed from the preparation subsystem by various manual and/or automated processes, such as pallet jacks, lifts, forklifts, robotic drive units, automated guided vehicles, other robotic or automated vehicles, or others. In addition, the carrier may be unloaded or removed from a frame and/or a base of the unloading system. Further, a control system may command or instruct removal of the carrier of the package stack from the preparation subsystem.

The process 600 may then end, as at 624. Following unloading and/or removal of the base or carrier from the system, the automated unloading system may then be ready to receive or load another package stack for automated unloading processes described herein.

Figure 7:
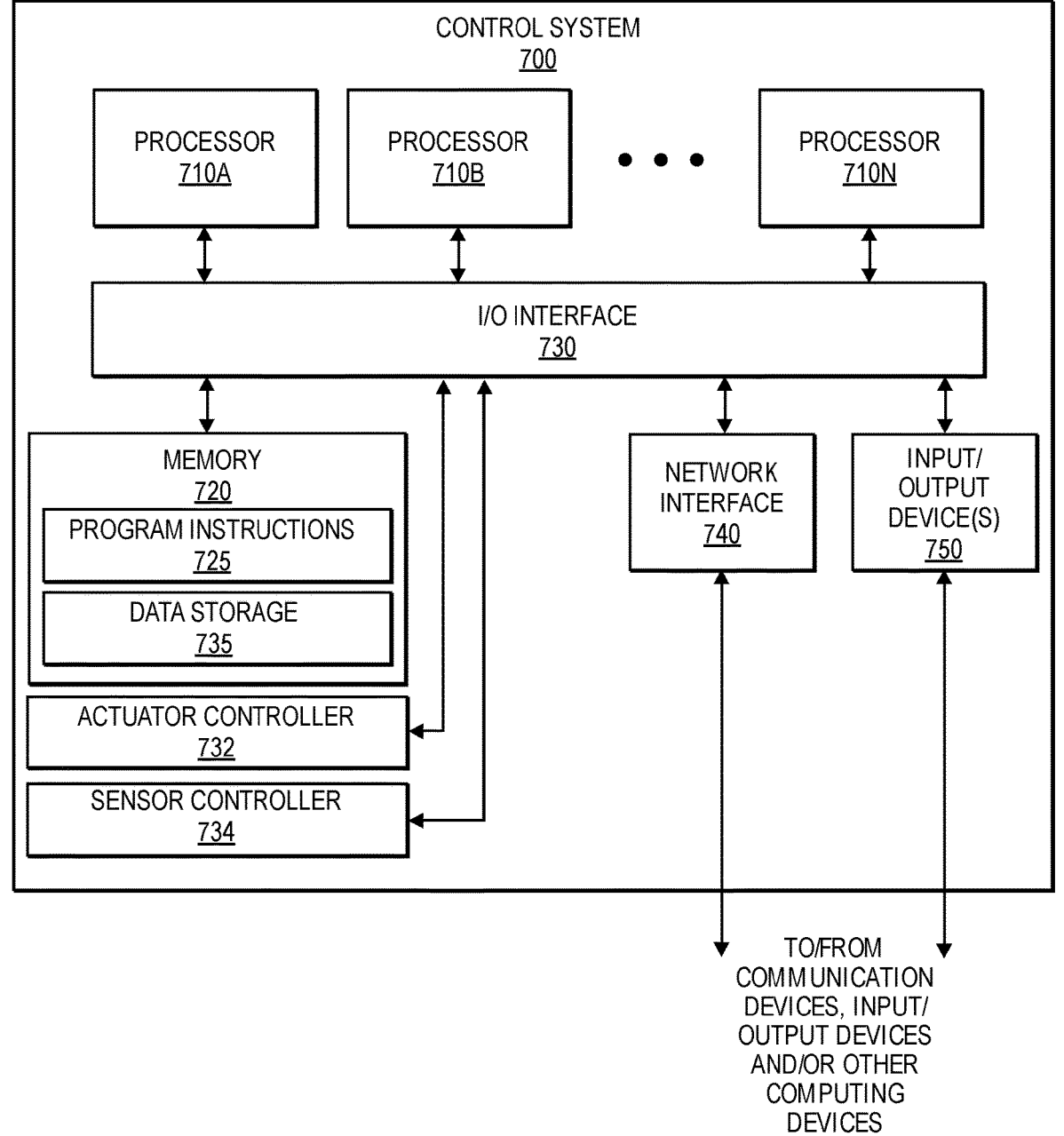
FIG. 7 is a block diagram illustrating various components of an example control system, in accordance with implementations of the present disclosure.

FIG. 7 is a block diagram illustrating various components of an example control system 700, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. In the illustrated implementation, a control system 700 includes one or more processors 710A, 710B through 710N, coupled to a non-transitory computer-readable storage medium 720 via an input/output (I/O) interface 730. The control system 700 further includes a network interface 740 coupled to the I/O interface 730, and one or more input/output devices 750. In some implementations, it is contemplated that a described implementation may be implemented using a single instance of the control system 700 while, in other implementations, multiple such systems or multiple nodes making up the control system 700 may be configured to host different portions or instances of the described implementations. For example, in one implementation, some data sources or services (e.g., related to portions of automated unloading systems, operations, or processes, etc.) may be implemented via one or more nodes of the control system 700 that are distinct from those nodes implementing other data sources or services (e.g., related to other portions of automated unloading systems, operations, or processes, etc.).

In various implementations, the control system 700 may be a uniprocessor system including one processor 710A, or a multiprocessor system including several processors 710A-710N (e.g., two, four, eight, or another suitable number). The processors 710A-710N may be any suitable processor capable of executing instructions. For example, in various implementations, the processors 710A-710N may be general-purpose or embedded processors implementing any of a variety of instruction set architectures (ISAs), such as the x86, PowerPC, SPARC, or MIPS ISAs, or any other suitable ISA. In multiprocessor systems, each of the processors 710A-710N may commonly, but not necessarily, implement the same ISA.

The non-transitory computer-readable storage medium 720 may be configured to store executable instructions and/or data accessible by the one or more processors 710A-710N. In various implementations, the non-transitory computer-readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 720 as program instructions 725 and data storage 735, respectively. In other implementations, program instructions and/or data may be received, sent or stored upon different types of computer-accessible media, such as non-transitory media, or on similar media separate from the non-transitory computer-readable storage medium 720 or the control system 700. Generally speaking, a non-transitory, computer-readable storage medium may include storage media or memory media such as magnetic or optical media, e.g., disk or CD/DVD-ROM, coupled to the control system 700 via the I/O interface 730. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 740.

In one implementation, the I/O interface 730 may be configured to coordinate I/O traffic between the processors 710A-710N, the non-transitory computer-readable storage medium 720, and any peripheral devices, including the network interface 740 or other peripheral interfaces, such as input/output devices 750. In some implementations, the I/O interface 730 may perform any necessary protocol, timing or other data transformations to convert data signals from one component (e.g., non-transitory computer-readable storage medium 720) into a format suitable for use by another component (e.g., processors 710A-710N). In some implementations, the I/O interface 730 may include support for devices attached through various types of peripheral buses, such as a variant of the Peripheral Component Interconnect (PCI) bus standard or the Universal Serial Bus (USB) standard, for example. In some implementations, the function of the I/O interface 730 may be split into two or more separate components, such as a north bridge and a south bridge, for example. Also, in some implementations, some or all of the functionality of the I/O interface 730, such as an interface to the non-transitory computer-readable storage medium 720, may be incorporated directly into the processors 710A-710N.

The network interface 740 may be configured to allow data to be exchanged between the control system 700 and other devices attached to a network, such as other control systems, material handling system controllers, warehouse management systems, other computer systems, robotic drive unit or automated guided vehicle controllers, robotic arms, machines, or systems, various types of sensors, various types of vision systems, imaging devices, or imaging sensors, upstream stations or processes, downstream stations or processes, other material handling systems or equipment, or between nodes of the control system 700. In various implementations, the network interface 740 may support communication via wired or wireless general data networks, such as any suitable type of Ethernet network.

Input/output devices 750 may, in some implementations, include one or more displays, screens, monitors, projection devices, cameras, imaging devices, other visual input/output devices, speakers, microphones, other audio input/output devices, keyboards, keypads, touchpads, scanning devices, sensors, photo eyes, proximity sensors, RFID readers, voice or optical recognition devices, other sensors described herein, or any other devices suitable for entering or retrieving data by one or more control systems 700. Multiple input/output devices 750 may be present in the control system 700 or may be distributed on various nodes of the control system 700. In some implementations, similar input/output devices may be separate from the control system 700 and may interact with one or more nodes of the control system 700 through a wired or wireless connection, such as over the network interface 740.

The control system 700 may also include an actuator controller 732 that is configured to command or instruct operations of various actuators associated with the automated unloading systems described herein, such as tilt mechanisms, opening or access actuators or elements of the preparation subsystem, slide mechanisms, conveyance mechanisms of the transfer subsystem, and/or other actuators. In addition, the control system 700 may also include a sensor controller 734 that is configured to detect, receive, and/or process data associated with various operations of the automated unloading systems described herein, such as presence of loaded carriers and/or package stacks, positions of tilted package stacks, status of opened package stacks, positions of transitioned package stacks, status of unloaded packages or stacks, and/or other aspects of various operations.

As shown in FIG. 7, the memory 720 may include program instructions 725 that may be configured to implement one or more of the described implementations and/or provide data storage 735, which may comprise various tables, data stores and/or other data structures accessible by the program instructions 725. The program instructions 725 may include various executable instructions, programs, or applications to facilitate automated unloading operations and processes described herein, such as tilt mechanism controllers, drivers, or applications, preparation subsystem controllers, drivers, or applications, slide mechanism controllers, drivers, or applications, transfer subsystem controllers, drivers, or applications, robotic drive unit or automated guided vehicle controllers, drivers, or applications, actuator controllers, drivers, or applications, sensor controllers, drivers, or applications, sensor data processing applications, vision system or imaging device controllers, drivers, or applications, imaging data processing applications, material handling equipment controllers, drivers, or applications, upstream station controllers, drivers, or applications, downstream station controllers, drivers, or applications, etc. The data storage 735 may include various data stores for maintaining data related to systems, operations, or processes described herein, such as automated unloading systems, preparation subsystems, transfer subsystems, tilt mechanisms, slide mechanisms, actuators, sensors, sensor data, vision systems or imaging devices, imaging data, carriers, items or packages, package stacks, material handling equipment or apparatus, upstream systems, stations, or processes, downstream systems, stations, or processes, etc.

Those skilled in the art will appreciate that the control system 700 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 700 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIG. 6, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An automated unloading system, comprising:
   a base configured to tilt between at least two positions, the base including a first portion comprising a preparation subsystem and a second portion comprising a transfer subsystem;
   a frame configured to slide within the base between the preparation subsystem and the transfer subsystem, the frame configured to receive a stack of packages at the preparation subsystem;
   the preparation subsystem including at least one element configured to enable access to the stack of packages; and
   the transfer subsystem including a plurality of belts configured to unload individual packages from the stack;
   wherein the preparation subsystem enables access to the stack when the base is in a first position;
   wherein the transfer subsystem unloads individual packages from the stack when the base is in a second position; and
   wherein in the second position, each of the base and the frame includes respective open sides that are aligned with each other, and the plurality of belts of the transfer subsystem are aligned with and extend along the respective open sides of the base and the frame.

2. The automated unloading system of claim 1, further comprising:
   a slide mechanism operatively coupled between the base and frame, and configured to slide the frame within the base between the preparation subsystem and the transfer subsystem.

3. The automated unloading system of claim 1, further comprising:
   a tilt mechanism associated with the base and configured to tilt the base between the at least two positions.

4. The automated unloading system of claim 1, wherein the first position is an opening position that is rotated in a first direction relative to an upright, nominal position.

5. The automated unloading system of claim 1, wherein the second position is an unloading position that is rotated in a second direction relative to the upright, nominal position, the second direction being opposite of the first direction.

6. A system, comprising:
   a base configured to rotate between at least two positions;
   a frame positioned within the base, the frame configured to receive a stack of packages; and
   a transfer subsystem including at least one conveyance mechanism configured to unload individual packages from the stack;
   wherein in an unloading position, each of the base and the frame includes respective open sides that are aligned with each other, and the at least one conveyance mechanism of the transfer subsystem is aligned with and extends along the respective open sides of the base and the frame.

7. The system of claim 6, wherein each of the base and the frame includes a floor, three closed sides, and the respective open side.

8. The system of claim 6, wherein the at least two positions of the base includes at least two of a nominal position, an opening position, and the unloading position.

9. The system of claim 6, further comprising:
   a tilt mechanism associated with the base and configured to rotate the base between the at least two positions;

wherein the tilt mechanism includes at least one of a rotary actuator, linear actuator, pneumatic actuator, pulley, servo, or rack and pinion mechanism.

10. The system of claim 6, further comprising:
    a preparation subsystem including an element configured to enable access to individual packages of the stack;
    wherein the element includes at least one of an actuator, hinge, slide, or cutter.

11. The system of claim 10, wherein the preparation subsystem enables access to the stack of packages when the base is rotated to an opening position.

12. The system of claim 10, further comprising:
    a slide mechanism operatively coupled between the base and the frame, and configured to slide the frame within the base between the preparation subsystem and the transfer subsystem;
    wherein the slide mechanism comprises at least one of a linear actuator, rotary actuator, pneumatic actuator, pulley, servo, screw drive mechanism, rack and pinion mechanism, belt, conveyor, roller, wheel, robotic drive unit, or automated guided vehicle.

13. The system of claim 6, wherein the at least one conveyance mechanism of the transfer subsystem comprises a plurality of belts, conveyors, sorters, rollers, or wheels configured to cause unloading of individual packages from the stack.

14. The system of claim 13, wherein at least some of the plurality of belts, conveyors, sorters, rollers, or wheels are actuated at selected speeds, directions, or sequences to cause unloading of individual packages from the stack.

15. The system of claim 6, wherein the transfer subsystem unloads individual packages from the stack when the base is rotated to the unloading position.

16. The system of claim 6, further comprising:
    at least one of a curtain or a crossbar associated with an upper portion of the base and configured to prevent uncontrolled unloading of individual packages from the stack.

17. A method, comprising:
    loading a stack of packages to a frame, the frame positioned within a base of an automated unloading system;
    rotating, via a tilt mechanism associated with the base, the stack of packages to an unloading position; and
    causing, via at least one conveyance mechanism of a transfer subsystem of the automated unloading system, unloading of individual packages from the stack;
    wherein in the unloading position, each of the base and the frame includes respective open sides that are aligned with each other, and the at least one conveyance mechanism of the transfer subsystem is aligned with and extends along the respective open sides of the base and the frame.

18. The method of claim 17, further comprising:
    rotating, via the tilt mechanism, the stack of packages to an opening position; and
    enabling, via an element of a preparation subsystem of the automated unloading system, access to individual packages of the stack;
    wherein rotating the stack to the opening position comprises rotating the base in a first direction relative to an upright, nominal position; and
    wherein rotating the stack to the unloading position comprises rotating the base in a second direction relative to an upright, nominal position, the second direction being opposite of the first direction.

19. The method of claim 18, wherein enabling access comprises at least one of removing a plastic wrap around a pallet, opening a door or panel of a cart, or removing a side of a gaylord.

20. The method of claim 18, further comprising:

prior to rotating the stack to the unloading position, sliding, via a slide mechanism operatively coupled between the frame and the base of the automated unloading system, the stack of packages from the preparation subsystem to the transfer subsystem.

* * * * *